March 26, 1957 E. A. STEINBOCK, JR 2,786,245
STERILIZER TRAY

Filed Sept. 12, 1949 2 Sheets-Sheet 1

INVENTOR.
EDMUND A. STEINBOCK, JR.
BY
Joseph A. Rave
ATTORNEY

March 26, 1957 E. A. STEINBOCK, JR 2,786,245
STERILIZER TRAY
Filed Sept. 12, 1949 2 Sheets-Sheet 2

INVENTOR.
EDMUND A. STEINBOCK, JR
BY
Joseph A. Rave
ATTORNEY

United States Patent Office 2,786,245
Patented Mar. 26, 1957

2,786,245
STERILIZER TRAY

Edmund A. Steinbock, Jr., Louisville, Ky.

Application September 12, 1949, Serial No. 115,247

1 Claim. (Cl. 21—105)

This invention relates to improvements in sterilizers, such as oil sterilizers, and particularly to improvements in the tray or instrument support employed with said sterilizer.

Sterilizers in and of themselves are quite old and well known but have had certain difficulties or drawbacks whereby they have not achieved their most useful results. For example, in the dental field an oil sterilizer can be of utmost value in cleaning, sterilizing and oiling the "handpieces," that is, the part that has attached to it the dental burs, drills, cleaning or buffing wheels, and the like, and connects said parts with the flexible driving shaft. These handpieces have all of said operations of cleaning, sterilizing and oiling, performed simultaneously in an oil sterilizer, but in the past could not be properly drained necessitating the taking apart of said handpieces in order to properly dry them out.

By the present invention this draining difficulty has been eliminated and the oil sterilizer made to perform at its maximum efficiency.

It is therefore the principal object of the present invention to provide improved draining facilities for a sterilizer and particularly for an oil sterilizer.

Another object of this invention is the provision of a tray for use with oil sterilizers provided with improved means for supporting substantially hollow tools or instruments so that the interior thereof may be properly and completely drained after having been submerged in a bath of heated oil for sterilizing purposes.

A further object of this invention is the provision of a sterilizer, particularly an oil sterilizer, with which is associated a removable tray or instrument support to facilitate the removal of the instruments from the sterilizer after the said instruments have been properly treated.

It is a still further and specific object of this invention to provide a sterilizer and particularly a tray therefor that will accomplish the foregoing objects that is inexpensive to produce yet efficient in operation.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings.

Throughout the several views of the drawings similar reference characters are employed to denote the same or similar parts.

Figures 2, 3:
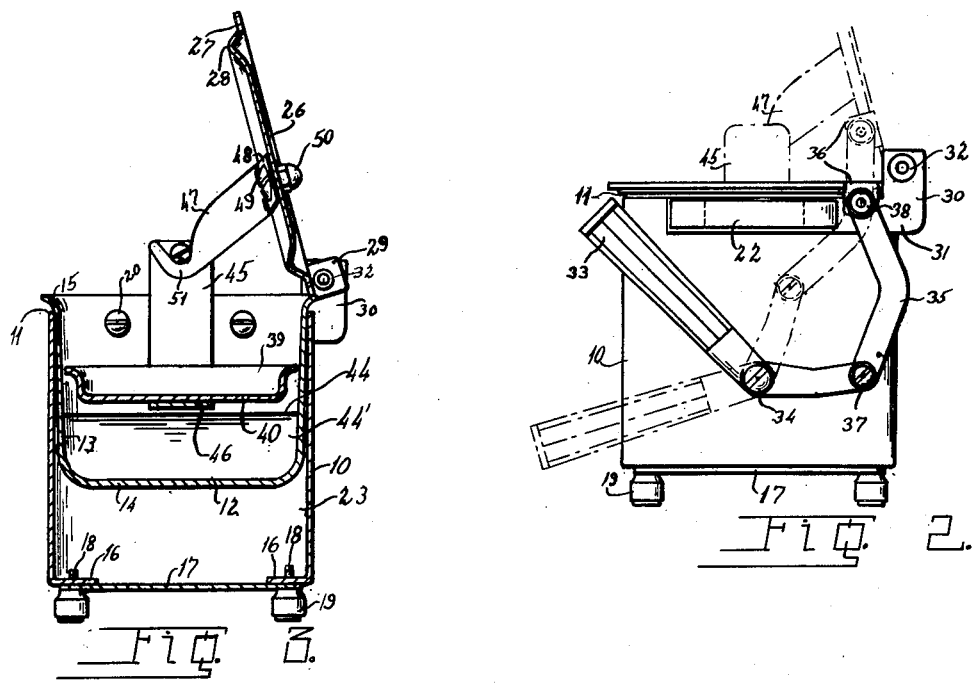
Fig. 2 is an end elevation of the sterilizer of Fig. 1 as seen from the righthand end of said Fig. 1.
Fig. 3 is a vertical sectional view through the sterilizer taken just inside the end of the tray or instrument support.

The sterilizer as disclosed in this application comprises an outer housing or shell 10 having an open upper end 11 into which is fitted the fluid container or pan 12 which has upstanding walls 13 and a bottom 14. The upper ends of the pan walls 13 are outwardly flared or beaded as at 15 to overlie the upper end 11 of the outer housing or shell 10. As illustrated in Fig. 3 the outer housing or shell walls have their lower ends inwardly turned to form flanges 16 against the undersurface of which is disposed a bottom plate 17 held in position by screws 18 that project from supporting feet 19.

Any suitable or desirable means may be employed for securing the pan 12 within the shell or outer housing 10, such as screws 20, which pass through the said pan end walls 13 and outer housing or shell end walls into the legs 21 of handles 22, one of which handles is located at each end of the sterilizer. The space 23 between the bottom 14 of the pan 10 and the shell or housing bottom closing plate 17 is employed for housing an electric heater, not shown, which heats the liquid, oil, normally within the pan 12. The heater is connected with a commercial electric current source by means of the usual electric wires 24 which are provided at their outer ends with the usual attaching plug 25 and which wires extend from the space 23 through the shell or outer housing righthand end wall, as seen in Fig. 1.

Disposed on the sterilizer is a cover or lid 26 which is suitably pressed to provide a peripheral flange 27 that in the closed position of the lid, Fig. 2, rests on the outwardly flared or beaded top 15 of the pan walls 13. Inwardly of the said peripheral flange the cover or top 26 is pressed to provide an inwardly projecting bead 28 that projects into the pan.

The cover or lid 26 has at each of its back corners an outwardly or upwardly projecting lug 29 respectively in face contact with an upstanding lug 30 on a bracket 31 at each end of the sterilizer. Extending through each of the said cover lugs 29 and its associated bracket lug 30 is a rivet 32 which constitutes the axis above which the cover or lid 26 is raised. Any suitable or desirable means may be employed for effecting the raising and lowering of the lid 26, that shown in the drawings comprising a handle or lever 33 pivoted intermediate its ends at 34 to one end of the sterilizer shell or housing 10. The lever 33 is connected by a link 35 with a downwardly projecting lug 36 on one end of the said cover or lid 26. In order for the linkage to operate the said parts are connected by pivots, selectively in the form of a bolt 37 and a rivet 38.

Figure 1:
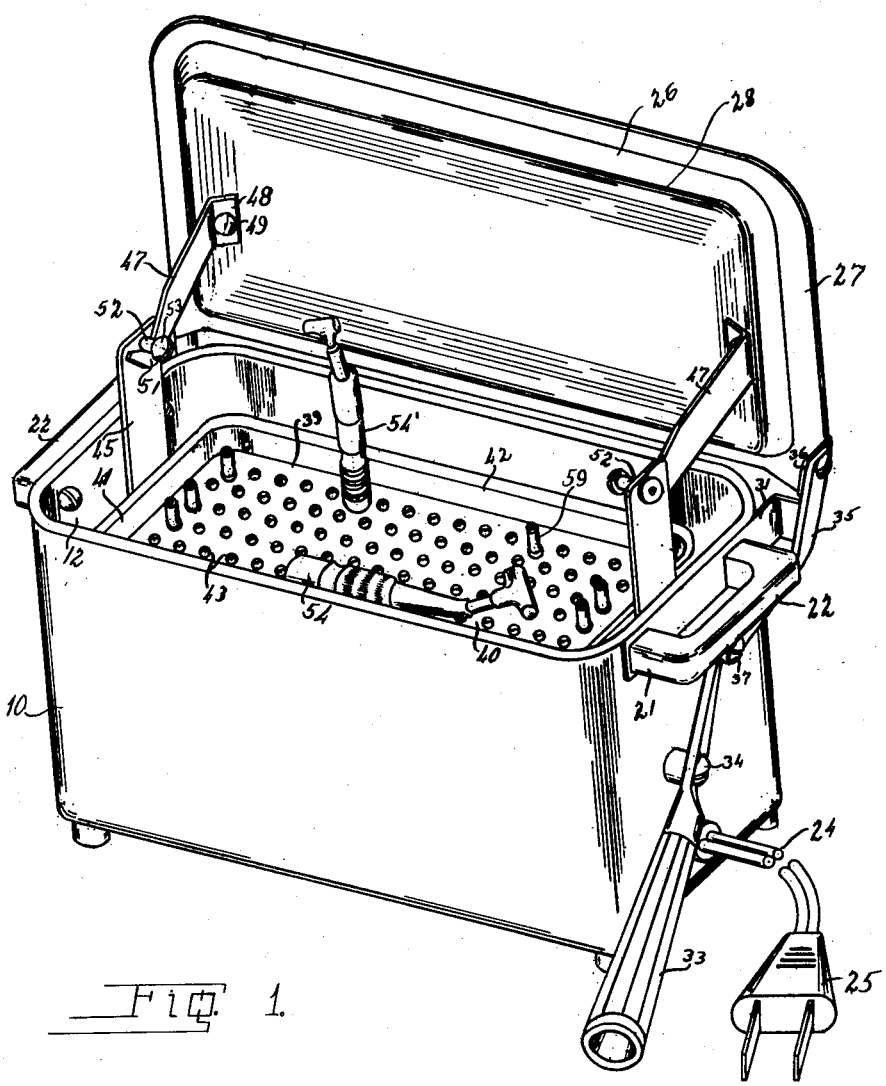
Fig. 1 is a perspective view of a sterilizer embodying the improvements of this invention.

The operation of these parts is believed obvious from Fig. 2 since with the parts in their solid line positions the cover or lid is closed while an actuation of the handle or lever 33, which automatically shifts the linkage, to the dotted line position automatically raises the cover or lid 26 to its open position, illustrated in Figs. 1 and 3.

Disposed within the pan 12 is an instrument support or tray 39 which comprises a bottom 40 having upstanding from opposite edges thereof ends 41 and from the remaining opposite edges sides 42. The said ends and sides 41 and 42 are comparatively short wherefore the tray 39 is relatively shallow. The bottom 40 of the tray is provided with a multiplicity of apertures 43 wherefore said bottom is substantially a screen affording substantially instantaneous drainage for a purpose as will presently be made clear.

The tray when the lid or cover 26 is in the closed position of Fig. 2 has its bottom 40 resting on the pan bottom 14 and is completely submerged in the liquid, oil, in said pan and which liquid 44' is normally to the height 44 in Fig. 3. When the lid or cover 26 is in its raised position it is above the liquid level 44 as clearly illustrated in Fig. 3. In order to elevate the tray 39 it is provided beyond each of its end walls 41 with an upstanding post 45 with which cooperates suitable raising mechanism, presently to be described; the upstanding posts 45 are each secured to the tray by having its lower end bent inwardly as at 46 to underlie the tray and through which bent portions and tray bottom fastening means pass.

The automatic raising of the tray 39 is accomplished by a pair of arms 47 respectively positioned so as to contact the inner face of one of the posts 45 and with said arms being carried by the lid or cover 26. Any suitable or desirable means may be employed for securing the arms to the cover or lid, that illustrated in the drawings comprising upsetting the outer ends of said arms to provide a foot 48 on each arm through which passes a bolt 49 to be exterior of the cover or lid and receive a nut 50, which secures the parts to one another through clamping engagement between the said nuts 50 and heads on the bolts 49. Each of the arms 47 is connected with its tray post 45 through any suitable or desirable means that shown in the drawings including the formation of a hook 51 at the inner end of each arm 47 which underlies the shank of a trunnion 52 inwardly projecting from the arm 45. The said hooks 51 are prevented from disassociation from the trunnions 52 by a head 53 on the inner ends of each of said trunnions 52.

From the foregoing it will be appreciated that closing the lid or cover 26 from the open position of Fig. 1 to the closed position of Fig. 2 will lower the tray 39 from the position illustrated in Fig. 3 until the tray bottom 40 rests on the pan bottom 14 and be completely immersed in the liquid 44', while reverse actuation of the cover or lid 26 from the position of Fig. 2 to that of Figs. 1 and 3 automatically elevates the tray above the liquid 44'. Since the tray bottom 40 is substantially a sieve any liquid thereon is substantially instantaneously drained back into the pan 12.

It should be noted that with the lid or cover 26 in its raised position of Fig. 3 the tray may be completely removed from the sterilizer by merely grasping the posts 45 and upwardly raising the said tray together with the parts, instruments, or the like disposed thereon.

As was noted above the sterilizer tray of this application is particularly concerned for cleaning, sterilizing and oiling the "handpieces" as employed by dentists. There is illustrated in Fig. 1 a handpiece 54 lying on the tray bottom 40 and which is the normal position of said instrument while on the tray and submerged in the liquid. It is understood that the said instrument, along with the various other instruments normally used by dentists and disposed on the tray bottom 40, are immersed in the liquid, which is maintained at a sterilizing heat, for the required length of time whereupon they are removed from such liquid to permit draining of the sterilizing liquid.

The internal construction of the handpiece 54 is of no particular consequence insofar as this application is concerned except that it has a substantially hollow body 55 and hollow head 56 interiorly of which is a rotatable shaft 57 journaled in suitable bearings such as 58 and connected with motion transmitting members to effect a rotation of a final drive member (not shown) in the angular head 56. It will be understood that the hot sterilizing, cleaning liquid, oil, will fill the hollow interior of the instrument body 55 and head 56 and surround all parts therein and that when lifted from the liquid and allowed to remain in the horizontal position the said interior will not properly drain so that if the instrument were placed in use, when cool enough to handle, the sterilizing liquid, oil, would then flow, as well as be driven by centrifugal force, from the said instrument onto the patient as well as onto the dentist or his assistant using the instrument.

In order therefore to properly drain the said handpieces the tray bottom 40 has upstanding from it a plurality of judiciously placed hollow posts 59 each of which is provided with a central aperture 60 and which is aligned with one of the apertures 43 in the tray bottom. The said posts may take any suitable or desirable form, that shown in the drawings being a preferred construction consisting of a base member 61 having a radial flange 62 that underlies the tray outwardly of the aperture with which it is associated and from which flange the base member has a hollow stud 63 projecting above the tray bottom a short distance. Received on the projecting stud 63 is an enlarged collar portion 64 of the post proper which upwardly from the collar portion 64 is in the form of a hollow sleeve 65.

Figure 4:
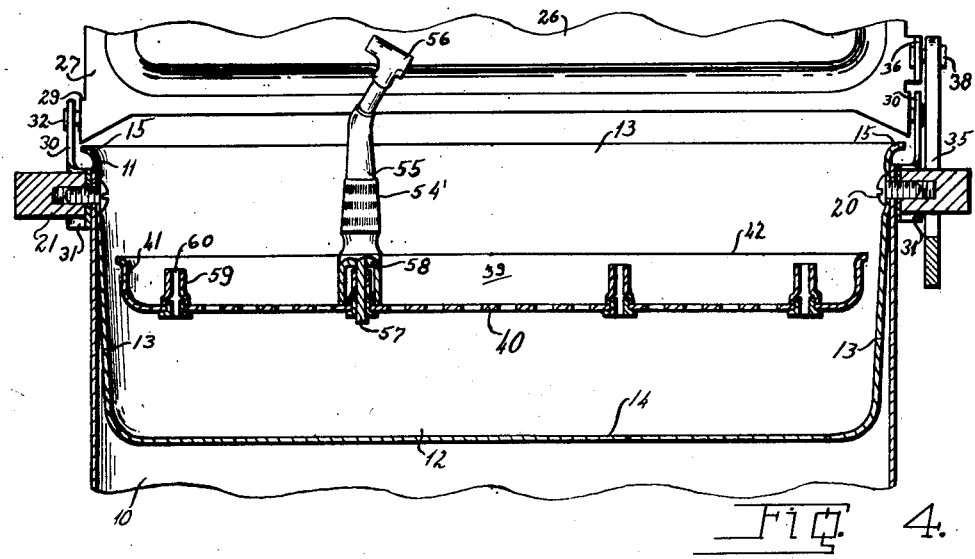
Fig. 4 is a fragmentary enlarged longitudinal sectional view through the upper end of the sterilizer with the sterilizer cover or lid raised.
Figure 5:
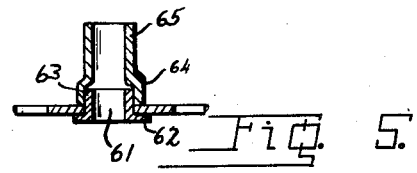
Fig. 5 is a fragmentary enlarged sectional view through one of the supports for draining hollow instruments.

As shown in Fig. 1 the said composite posts 59 are located just inwardly of the tray end walls 41 and inwardly of the remote side wall 42. The composite posts are adapted to enter into the lower open end of the instrument body 55 and have the driving shaft or driving pin 57 of said instrument inserted through the aperture or passageway 60 of said posts as clearly illustrated in Fig. 4. The said instrument then occupies the position of handpiece 54' in Figs. 1 and 4 whereby the liquid, oil, may readily drain by gravity from said body portion 55 and head 56 back into the pan 12 and by the time the said handpiece is cool enough to use all excess liquid has drained therefrom. It will be appreciated however that a film of the liquid, oil, would remain around the driving shaft or pin 57 and its bearings 58 as well as on other rotatable or movable joints of the operating parts so that the said parts are fully and adequately lubricated at all times and are at the same time clean and sterile. It will be understood that the support of the handpieces or instruments is quite a substantial one whereby the said instruments are retained in their upsetting position free of any inadvertent upsetting until they have completely drained and are removed by the user.

As shown in Fig. 1 the composite posts 59, adjacent the tray ends 41 and substantially midway of the width of the tray, serve the additional function of being the sole means for securing the tray uprights or posts 45 to the tray bottom 40. This function is performed without interfering with the function of said posts 59 as "handpieces" supports and drains.

From the foregoing, it will now be appreciated that there has been provided an oil sterilizer that accomplishes the objects initially set forth and otherwise provided a novel device for adequately draining dentist's handpieces and other instruments.

What is claimed is:

As an article of manufacture a tray for use with a sterilizer comprising a perforated bottom with upstanding side and end walls, upstanding composite hollow posts respectively associated with a selected few perforations along the tray side and end walls, each composite post comprising a stud having a central passage and a radial flange with said stud projecting through its perforation with its radial flange in face contact with the tray bottom surface around the perforation, and a sleeve having a central passage with a radial flange at one end and receiving the stud in its central passage with its flange in face contact with the tray bottom upper surface around its perforation, and tray transporting and suspending means at each end thereof comprising a post having its lower end inwardly disposed to underlie the tray bottom with said inwardly disposed portions each having apertures therein to align with apertures in the tray bottom, and said posts' inwardly disposed portions being permanently attached to the tray bottom by certain of the composite hollow posts located adjacent the tray ends.

(References on following page)

References Cited in the file of this patent

UNITED STATES PATENTS

| | | |
|---|---|---|
| 695,446 | Doherty | Mar. 18, 1903 |
| 780,797 | Hoeregott et al. | Jan. 24, 1905 |
| 878,353 | Compton | Feb. 4, 1908 |
| 1,318,246 | Underwood | Oct. 7, 1919 |
| 1,365,686 | Harvey | Jan. 18, 1921 |
| 1,758,537 | Rakestraw | May 13, 1930 |
| 1,983,390 | Mueller | Dec. 4, 1934 |
| 2,281,882 | Kinsman | May 5, 1942 |
| 2,471,303 | Brewster | May 24, 1949 |

FOREIGN PATENTS

| | | |
|---|---|---|
| 463,745 | Great Britain | Apr. 6, 1937 |